United States Patent [19]
Matsuo et al.

[11] Patent Number: 5,394,710
[45] Date of Patent: Mar. 7, 1995

[54] REFRIGERATING APPARATUS

[75] Inventors: Hiroki Matsuo, Anjo; Yasushi Yamanaka, Nakashima; Kenichi Fujiwara, Kariya, all of Japan

[73] Assignee: Nippondensco Co., Ltd., Kariya, Japan

[21] Appl. No.: 145,738

[22] Filed: Nov. 4, 1993

[30] Foreign Application Priority Data

Nov. 6, 1992 [JP] Japan ............................ 4-297407
Jul. 30, 1993 [JP] Japan ............................ 5-190323

[51] Int. Cl.⁶ .......................................... F25B 39/04
[52] U.S. Cl. ............................. 62/509; 165/113; 165/132
[58] Field of Search ................. 62/509; 165/113, 132

[56] References Cited
FOREIGN PATENT DOCUMENTS
60-138379  7/1985  Japan.
0953368    4/1991  Japan ........................... 62/509

Primary Examiner—William E. Wayner
Attorney, Agent, or Firm—Cushman, Darby & Cushman

[57] ABSTRACT

A refrigerant receiver of elongated pipe 4 shape arranged in front of a refrigerant condenser 3. The receiver is of a dimension matched to that of the condenser, and has an inlet 34 for connection with the condenser section 13 and an outlet 38 for connection with a supercooler section 14. The receiver has inclined pipe portions 35 and 37 having inclinations to the horizontal direction, between which a bent portion 36 is arranged. No bubble is created in the refrigerant in the receiver irrespective of large values of the inclination of the receiver, thereby allowing only the liquid phase refrigerant to flow into the supercooler 14 from the outlet of the receiver 4.

7 Claims, 11 Drawing Sheets

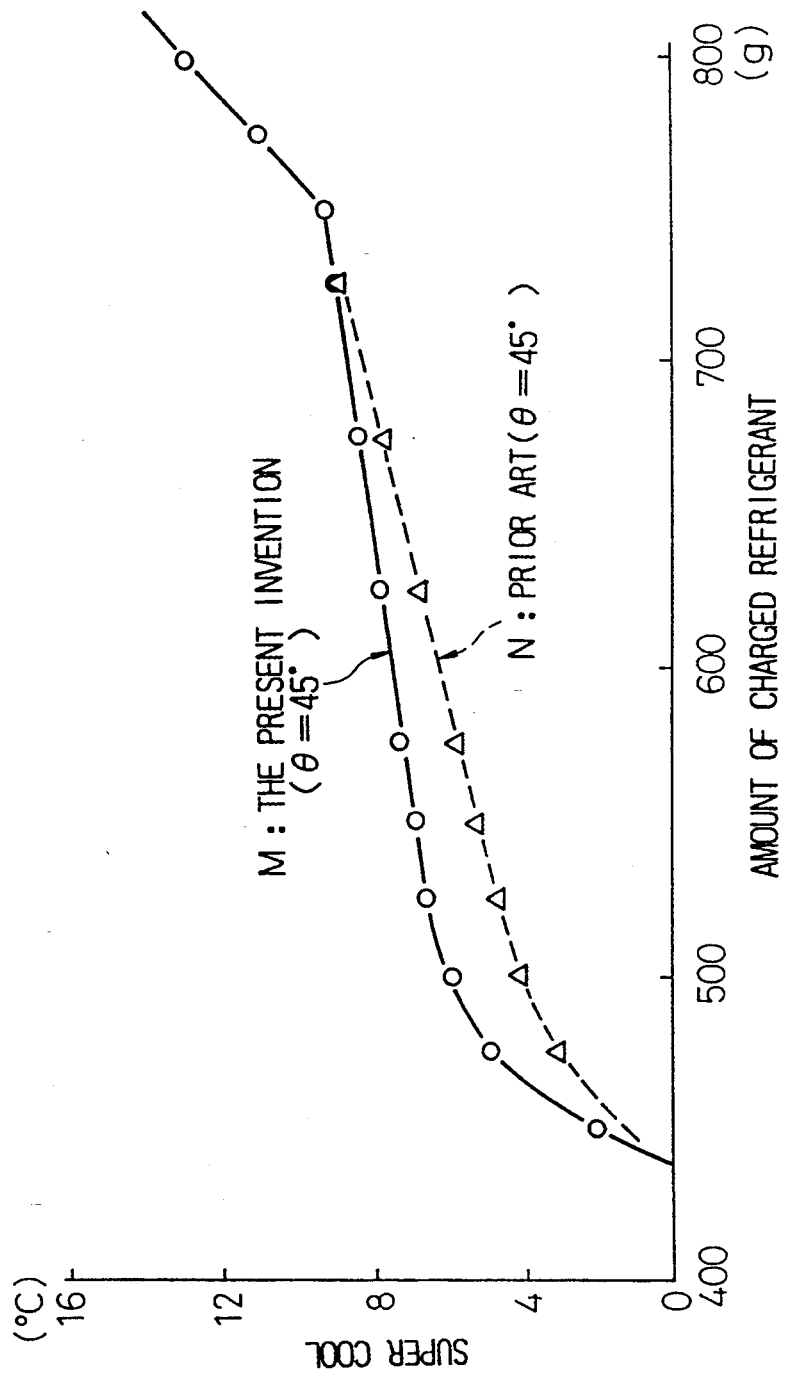

PRESENT INVENTION

REFRIGERATING APPARATUS

BACKGROUND OF THE INVENTION

1. Field of the Invention

The present invention relates to a refrigerating system having, on an air inlet side of a condenser for condensing a refrigerant, a receiver of elongated tubular shape of a length corresponding to the dimension of the condenser, and the refrigerating system can be suitably used for an air conditioning system for a vehicle.

2. Description of Related Art

A refrigerating system for an air conditioning system for a vehicle includes, generally, a compressor, a condenser, a receiver, a pressure reducing device, and an evaporator, which are arranged in a refrigerant recirculating line. The condenser and the receiver must be arranged in separate locations in an engine compartment of the vehicle, which only has very limited available space. As a result, it has heretofore been required that an improved construction of the air conditioning system, capable of being fitted in a reduced space in the engine compartment was provided.

In order to reduce the space that the air conditioning system occupies in an engine compartment, a Japanese Un-Examined Patent Publication 60-138379 proposes a refrigerating system for a vehicle, where a refrigerant receiver formed as an elongated pipe of a length corresponding to a dimension of a refrigerant condenser is arranged in front of an air inlet of the condenser, so that the elongated receiver is inclined at a predetermined angle $\theta$ with respect to a horizontal direction. In this prior art construction, a value of the inclined angle as small as, for example, about 20° with respect to a horizontal direction can reduce a vertical component in the velocity of a refrigerant flowing in the receiver. As a result, even when a large amount of the recirculated refrigerant, due to a high rotational speed of the compressor, is circulated the gas to liquid boundary in the receiver is not disturbed. This allows only a liquid-state refrigerant to be supplied to the condenser.

In the prior art construction, when a dimensional limitation exists in enlarging the width of the refrigerant condenser, there may arise a situation that the inclination angle $\theta$ of the receiver is increased to 40° or more, which causes the vertical velocity component to become large in the flow of the refrigerant in the receiver, which causes the refrigerant to bubble in the receiver, which prevents a gas-liquid boundary from being properly maintained. As a result of such a lack of a gas-liquid boundary, the refrigerant from the receiver is issued to a pressure reducing device in the refrigerating cycle as a mixed gas and liquid. As a result, a reduction in the amount of the liquid state refrigerant in the pressure reducing device occurs. Furthermore, an in-flow of the gaseous refrigerant to the pressure reducing device occurs, which causes the pressure reducing device to be subjected to hunting, which causes the refrigerating performance to be reduced.

Furthermore, in case of a vehicle having an air conditioning system having a supercooler between the receiver and the pressure reducer, an imperfect separation of the gaseous medium from the liquid state medium makes it impossible to obtain a desired supercooling performance, which also causes the cooling efficiency to be reduced.

SUMMARY OF THE INVENTION

An object of the present invention is to provide a refrigerating device, capable of preventing two phase refrigerant from being discharged from a pipe-shaped receiver.

According to the present invention, a refrigerating apparatus is provided, comprising:

- a compressor for compressing a refrigerant;
- a condenser for condensing the refrigerant from the compressor;
- a receiver for receiving the refrigerant from the condenser;
- a pressure reducer for reducing the pressure of the refrigerant from the receiver;
- an evaporator for evaporating the refrigerant from the pressure reducer, and;
- a recirculating line for connection of the compressor, the condenser, the receiver, the pressure reducer and the evaporator to obtaining a refrigerating circuit;
- said condenser defining spaced apart surfaces and being in contact with an air flow so that a heat exchange can take place between the air flow transverse to said surfaces and the refrigerant flowing in said condenser;
- said receiver being arranged adjacent one of the surfaces of the condenser to which the air flow is introduced, the receiver being constructed as an elongated pipe having a refrigerant inlet and a refrigerant outlet, which is located at a position lower than that of the inlet end, and an intermediate pipe having portions inclined with respect to a horizontal direction and at least one bent portion between the inclined portions for obtaining a rapid change in the direction of the flow of the refrigerant in the receiver.

BRIEF DESCRIPTION OF ATTACHED DRAWINGS

FIG. 1 generally illustrates a refrigerating system in the first embodiment.

FIG. 4 is a relationship between the amount of the refrigerant in the refrigerating system and the degree of supercooling.

DESCRIPTION OF PREFERRED EMBODIMENTS

Figure 1:
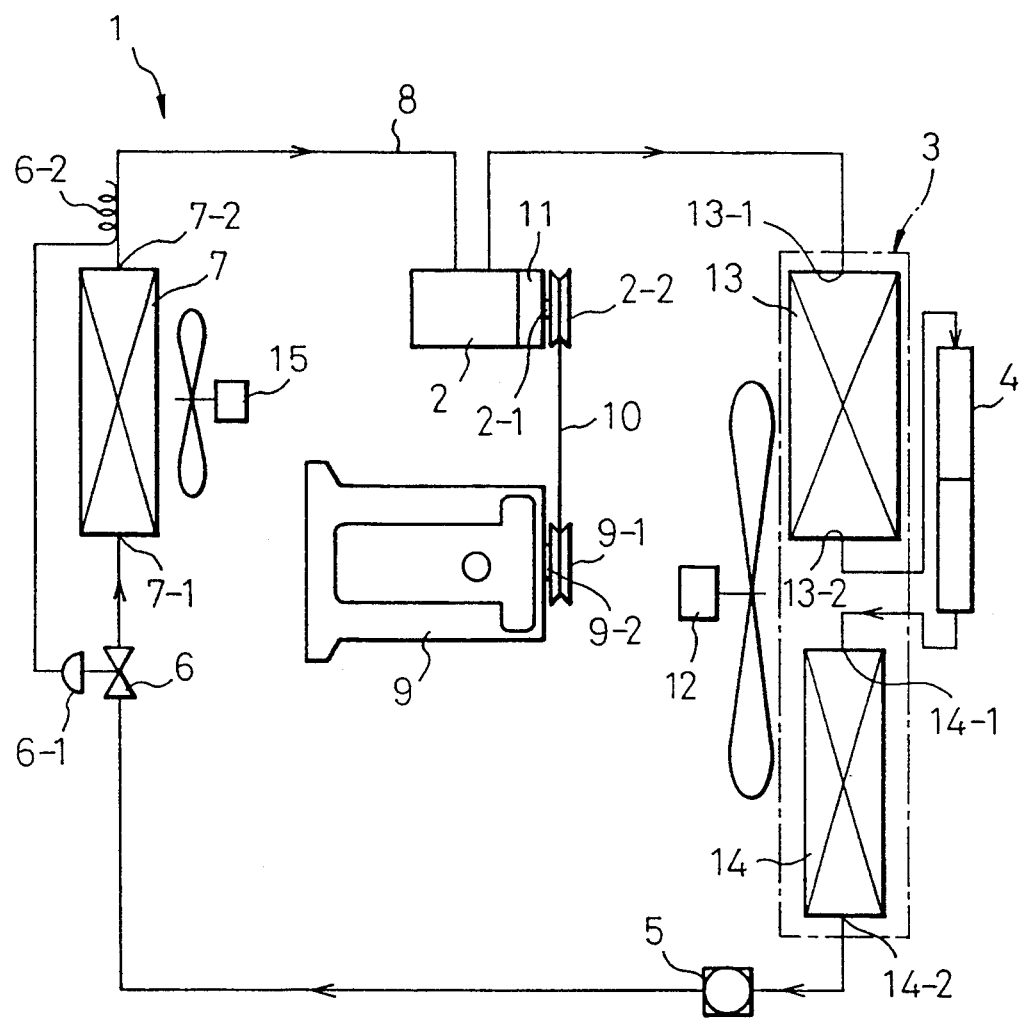

A first embodiment of the present invention will be now explained with reference to FIGS. 1 to 4. FIG. 1 shows a refrigerating cycle for an air conditioning system for an automobile. The refrigerating cycle includes a compressor 2 for compressing a refrigerant, a condenser 3 for condensing the refrigerant from the compressor 2, a receiver 4 for receiving the refrigerant from the condenser 3, a sight glass 5, an expansion valve (pressure reducer) 6 for reducing the pressure of the refrigerant, a evaporator 7 for gasifying the refrigerant, and a recirculation pipe lines 8 in which the elements 2, 3, 4, 5, 6 and 7 are mounted.

The compressor 2 is arranged in an engine compartment (not shown) of a vehicle together with an internal combustion engine 9. The compressor 2 has a drive shaft 2-1, on which a pulley 2-2 with a clutch 11 is provided. The pulley 2-2 is connected to a pulley 9-1 on a crankshaft 9-1 of the engine 9 via a belt 10 for transmission of the rotational movement of the engine 9 to the compressor 2 when the clutch 11 is engaged, so that the gaseous refrigerant from the evaporator 7 is sucked into the compressor 2 and is discharged into the condenser 3 under a compressed state.

The condenser 3 is constructed by a condenser part 13 and a supercooler part 14. The condenser part 13 includes an inlet 13-1 for connection with the outlet of the compressor 2 and an outlet 13-2 for connection with the receiver 4. The condenser part 13 is for a heat exchange between the gaseous refrigerant from the compressor and an outside air flow generated by a fan 12, so that the refrigerant is condensed. The condensed refrigerant is introduced into the receiver 4 where a gas phase refrigerant is separated from the liquid state refrigerant. The supercooler section 14 has an inlet 14-1 for connection with the receiver 4 for receiving the liquid state refrigerant from the receiver, and an outlet 14-2 for discharge of the supercooled liquid state refrigerant to the expansion valve 6. At the supercooler section 14, heat exchange between the liquid state refrigerant and the outside air flow takes place so that a supercooled state of the liquid refrigerant is obtained.

The sight glass 5 is disposed in the recirculation pipe 8 at the upstream of the expansion valve 6 for monitoring the condition of the refrigerant from the condenser 3. Namely, an operator can check whether or not the refrigerant from the condenser 13 is fully liquidized.

The expansion valve 6 works as a pressure reducing device, whereat the liquid state refrigerant, at a high pressure, from the condenser 3 is subjected to an adiabatic expansion to obtain a mist state of the refrigerant at low pressure. As an example, the expansion valve 6 is of an automatic type having an actuator 6-1 for controlling the degree of the opening of the valve 6 and a sensor 6-2 for detecting the temperature of the refrigerant at an outlet of the evaporator 7. The actuator 6-1 automatically controls the degree of the opening of the valve 6 for obtaining a predetermined degree of superheating at the outlet 7-2 of the evaporator 7.

The evaporator 7 has an inlet 7-1 connected to the expansion valve, so that the mist state (gas and liquid mixed state) refrigerant from the expansion valve 6 is introduced into the evaporator 7. At the evaporator, a heat exchange occurring between the mist state refrigerant and an air flow created by a blower 15 so that the refrigerant is evaporated.

Figure 2:
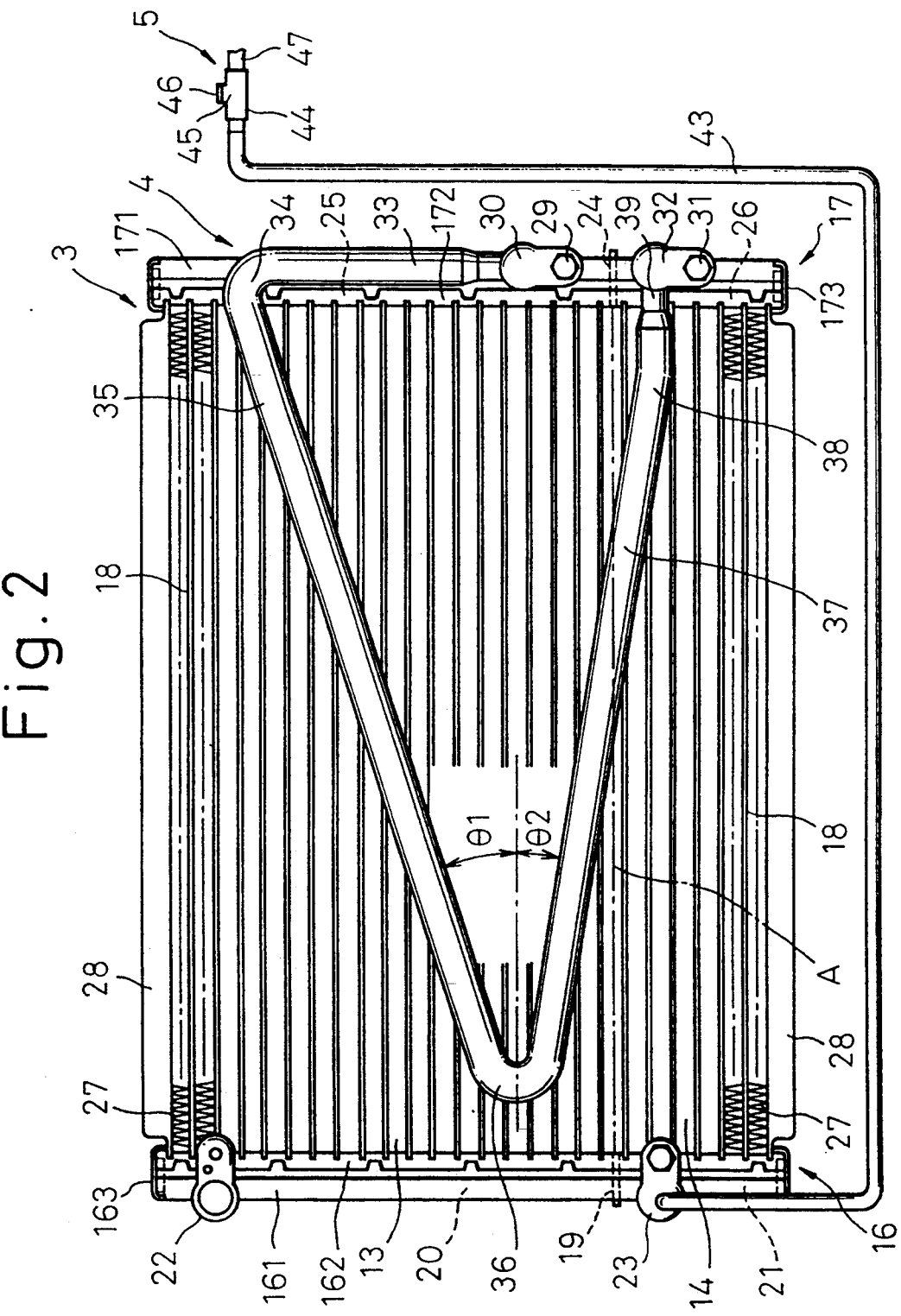
FIG. 2 is a front view of a condenser with a receiver according to the present invention.

FIG. 2 shows a detailed, combined construction of the condenser 3 together with the sight glass 5. The condenser 3 has, for example, a height H of a value in a range between 300 mm and 400 mm, and a width W of a value in a range between 300 mm and 600 mm. Furthermore, a bracket (not shown) is provided for connecting the condenser 3 to a location of the engine room, which can easily receive an air flow generated when the vehicle is moving.

The condenser 3 includes, as shown in FIG. 2, a first, vertical header 16 shown in the left hand side and a second, vertical header 17 shown on the right hand side, and a plurality of parallel horizontal, heat exchanging tubes 13 for connecting the first and second headers 16 and 17 with each other by means of, for example, soldering.

The first header 16 is formed as a circular tube made from a metal material such as aluminum or an aluminum alloy with an increased anti-corrosion property as well as good heat conductivity. The first header 16 is constructed from a first part (tank plate) 161 of substantially semi-circular shape and a second part (header plate) 162 of substantially U-cross sectional shape. These parts 161 and 162 are connected with each other at their facing edges, and caps 163 are fitted to the top and bottom open ends of the header 16. The header plate 162 forms, along the length thereof, a plurality of spaced apart holes (not shown), to which the tubes 18 are, at their respective first or left-handed ends, inserted, and the header plate 162 and the tubes 18 are connected with each other by means of suitable means, such as a soldering. Furthermore, a partition wall 19 is arranged inside the first header 16 so that the space inside the header 16 is divided into an upper, inlet side tank section 20 of the condenser part 13 and a lower, outlet side section 21 of the supercooler section 14. Furthermore, connected to the first header 16 by suitable means, such as a soldering, are an inlet fitting 22 for connection of the inlet side tank 20 of the condenser part 13 with a pipe (not shown) from the compressor 2 in FIG. 1 for introduction of gaseous refrigerant into the tank 20 and an outlet fitting 23 for connection of the outlet side tank 21 of the supercooler section 14 with a pipe 43 to the sight glass 5 for discharge of the liquid refrigerant from the supercooler section 14.

In FIG. 2, as similar to the first header 16, the second header 17 is also formed as a circular tube made of a metal material such as aluminum or an aluminum alloy, and is constructed from a first part (tank plate) 171 of substantially semi-circular cross sectional shape and a second part (header plate) 172 of substantially U-cross sectional shape. These two parts 171 and 172 are connected with each other at their facing edges, and caps 173 are provided at the top and bottom ends of the header 17 to be fitted thereto. The header plate 172 forms, along the length thereof, a plurality of spaced apart holes (not shown), to which the tubes 18 are, at their respective second or right-handed ends, inserted, and the header plate 172 and the tubes 18 are connected with each other by means of suitable means, such as a soldering. Furthermore, a partition wall 24 is arranged inside the second header 17 so that the space inside the header 17 is divided into an upper, outlet side tank section 25 of the condenser part 13 and a lower, inlet side section 26 of the supercooler section 14. Furthermore, connected to the second header 17 are an inlet fitting (not shown) for connection of the outlet side tank 25 with an inlet part 34 of a receiver 4 and an outlet fitting (not shown) for connection of the inlet side tank 26 of the supercooler section 14 with an outlet part 38 of the receiver 4.

The plurality of heat exchanging tubes 18 are, as similar to the first and second headers 16 and 17, made from a metal material such as aluminum or an aluminum alloy, and are formed as a tube with a flattened circular section. Arranged between the tubes 18, which are adjacent with each other, are corrugated fins 27 which are connected to the outer surfaces of the tubes 18 by a suitable means such as soldering. The fins 27 are for increasing the heat exchange efficiency. At locations outside of the corrugated fins 27 at the top and bottom, side plates 28 for connection of the condenser assembly 3 to the vehicle are connected by means of a suitable means such as soldering.

As will be clear from the above explanation of the condenser 3, the condenser part 13 is constructed of the inlet side tank section 20 above the partition 19, the outlet side tank section 25 above the partition 24, and the heat exchanging tubes 18 connecting the tank sections 20 and 25 located above a dotted line A. In other words, the tubes 18 above the line together with the fins connected thereto construct a heat exchanging core of the condenser part 13. Contrary to this, the supercooler section 14 is constructed by the inlet side tank section 26 below the partition 24, the outlet side tank section 21 below the partition 19, and the heat exchanging tubes 18 connecting the tank sections 26 and 21 located below the dotted line A. In other words, the tubes 18 below the line together with the fins connected thereto construct the heat exchanging core of the supercooler section 14. In this embodiment, the number of the tubes 18 at the core portion of the condenser part 13 is larger than the number at the core portion of the supercooler section 14. Tests conducted by the inventors has revealed that a percentage of the number of the tubes 18 at the core portion of the supercooler section 14 to the total number of the tube 18, which corresponds to the percentage of the area of the core portion of the supercooler section 14 to the total area of the core of the condenser 3 is, preferably, in a range between 15 to 30%.

Now, a construction of the receiver 4 will be explained with reference to FIGS. 2 and 3. According to this embodiment, the receiver 4 is made from a pipe of a circular cross sectional shape made from a metal material such as aluminum or an aluminum alloy of diameter of, for example, 13 mm or 17 mm, which is subjected to bending to obtain a triangular shape which allows the dimension to correspond to that of the refrigerant condenser 3. The receiver 4 is arranged in a location of the engine compartment of the vehicle, capable of receiving the air flow generated by the movement of the vehicle. Namely, the receiver 4 is, for example, arranged in front of the condenser 3, i.e., the inlet side of the condenser, and is connected to the vehicle body by means of a suitable means such as a bracket or stay (not shown).

The receiver 4 is, at its inlet end for receiving the refrigerant, provided with a inlet connector 30 for connection with the inlet fitting (not shown) on the second header 17 (the outlet tank 25 from the condenser section 13) by means of a suitable fixing means such as a bolt 29. Furthermore, the receiver 4 is, at its outlet end for discharging the refrigerant, provided with an outlet connector 32 for connection with the outlet fitting (not shown) on the second header (the inlet tank 26 to the super cooler section 14) by means of a suitable fixing means such as a bolt 31.

Figure 3:
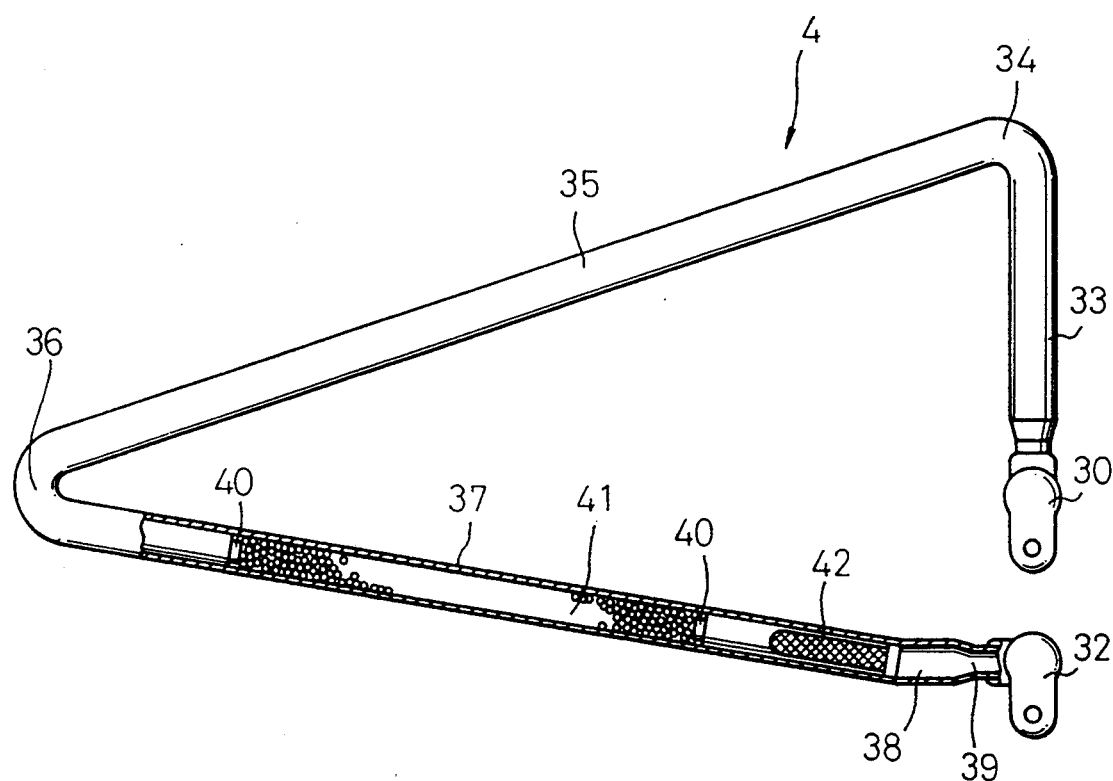
FIG. 3 is similar to FIG. 2, but only shows the receiver.

As shown in FIGS. 2 and 3, the receiver 45 is constructed by an inlet pipe portion 33 which extends vertically upwardly from the inlet connector 30 along the first header portion 17, a first inclined pipe portion 35 which is bent with respect to the inlet pipe portion 33 via a refrigerant inlet pipe portion 34, which extend toward the first header 16 at an angle $\theta 1$, which is, for example, equal to 45° with respect to a horizontal direction, a second inclined pipe portion 37 which is bent with respect to the first inclined pipe portion 35 via a bent pipe portion 36 toward the second header 17 at an angle $\theta 2$ which is equal, for example, to 30°, a refrigerant outlet pipe portion 38 slightly bent with respect to the second inlet pipe portion 37 toward the connector 32, and an outlet connector pipe portion 39 which extends from the outlet pipe portion 38 to the outlet connector 32.

In this construction of the receiver 4, the part from the refrigerant inlet pipe portion 34 to the outlet portion 38 function as a liquid receiver, for which these portions are constructed such that the refrigerant flows from the top to the bottom. Namely, the inlet portion 34 receives the refrigerant from the condenser section 13, which is mostly liquidized but is partially gasified. The gaseous refrigerant is fully liquidized so that a gas-to-liquid boundary is created at a location between the bent portion 36 and the refrigerant outlet part 38, so that only the liquidized refrigerant is supplied to a supercooling section 14 of the condenser 3.

Namely, the receiver 4 functions to maintain a saturated condition of the refrigerant at the outlet pipe 38 and the outlet connection part 39 irrespective of any change in an operating condition of the air conditioning device of the vehicle, i.e., the variation of the rotational speed of the compressor 2 in the refrigerating system. The inclined pipe portions 35 and 37 preferably have values of the inclination angles $\theta 1$ and $\theta 2$ which are in a range between 10° and 45°, so that a desired gas-liquid phase separation operation can be obtained irrespective of the inclination of the vehicle when it is moving.

As shown in FIG. 3, the inclined pipe portion 37 of the receiver 4 has, at its inner space, a dryer 41 which is constructed by a pair of spaced holders 40, drying agents for eliminating the moisture in the liquid state refrigerant stored in a space between the holders 40, and a filter 42 having a fine mesh construction for removing foreign products such as dust or impurities in the liquid state refrigerant. These holders 40 are constructed by a punched metal plates having a plurality of small openings. These parts for constructing the dryer 41 are stored in the receiver 4 before it is bent to the triangle shape.

The filter 42 has an outer diameter slightly smaller than the inner diameter of the receiver 4, and forms as a cylindrical tube made from metal or resin material. In case where the filter 42 is made from a resin material, connections between the receiver 4 and the inlet side connector 30 and between the receiver 4 and the outlet side connector 32 are done by crimping while O-rings (not shown) are arranged therebetween. Such a connection can prevent heat from being applied to the connected parts.

Now, a detailed construction of the sight glass 5 will be explained with reference to FIG. 2. According to this embodiment, the sight glass is arranged in a location inside the engine compartment of the vehicle, which makes it easy for a checker to visually determine if a desired amount of the refrigerant exists in the receiver 4, i.e., a location adjacent the condenser 3. The sight glass 5 is constructed from a tubular body 44 connected to the metal pipe 43 and a transparent glass plate fitted to and thermally attached to a sight window (not shown) form at the top of the body 44. The pipe 43 made of the metal material is, at its inlet, connected to the outlet fitting 23 of the outlet section 21 of the supercooler 14 by means of welding connection or mechanical connecting means, and is, at its outlet, connected to the body 44 of the sight glass by means of welding or mechanical connecting means. Furthermore, the body 44 has an outlet section connected to the expansion valve 6 in FIG. 1 by means of a pipe 47 made of metal material.

Now, the operation of the first embodiment will be explained with reference to FIGS. 1 to 4. Upon a commencement of the operation of the air conditioning apparatus, an engagement of the electromagnetic clutch 11 occurs, so that a rotational movement from the engine 9 is transmitted to the compressor 4 by way of the pulley 9-1, the belt 10 and the pulley 2-2. As a result, the refrigerant is sucked into the compressor 4 and a high pressure gaseous refrigerant is discharged into the condenser 3. Namely, the gaseous state refrigerant is, first, introduced into the inlet side tank section 20 of the first header 16 via the inlet fitting 22, and second, is distributed into the tubes 18 which are located above the line A for constructing the core part of the condenser section 13. When the distributed gaseous refrigerant pass through the tubes 18 of the condenser section 13, the refrigerant in the tubes 18 is subjected to a heat exchange with the outside air flow generated by the rotation of the fan 12 and contacting with outer walls of the tubes 18, so that a major part of the gaseous refrigerant in the tubes changes to a liquid state, while a minor part remains in a gaseous state. Thus, two phase refrigerant flows into the inlet tank section 25 of the second header tank 17, and is then introduced into the receiver 4.

The refrigerant flowing into the receiver 4 as a gas-liquid mixture is moved, via the inlet connector 30 and the inlet connector pipe portion 33, to the refrigerant inlet part 34 at the top portion of the receiver 4. The gas-liquid mixture, combined at the refrigerant inlet part 34 is, then, moved downwardly along the inclined pipe portion 35 at a mild inclination of $\theta 1$ ($=45°$), so that the speed of the movement of the refrigerant at the pipe portion 35 is reduced before it is reaches the bent portion 36. The gas-liquid, combined state refrigerant is, when it moves along the bent portion 35, subjected to a rapid change of the direction of its movement, resulting in a centrifugal separation of the gaseous phase from the liquid phase. Namely, when the gas-liquid combined state refrigerant passes through the bent pipe portion 36 of the receiver 4, the liquid state refrigerant of a larger specific weight is moved to an outer (large diameter) side of the inner wall of the bent pipe portion 36 and flows along the lower side of the inner wall, while the gaseous state refrigerant of a smaller specific weight is moved to an inner (small diameter) side of the inner wall of the bent pipe portion 36 and flows along the upper side of the wall. The employment of the bent pipe portion 36 allows the centrifugal force to be effectively used, so that a separation between the liquid phase refrigerant and gaseous phase refrigerant of different values of specific weight is realized along the vertical direction of the receiver 4. In addition, the provision of the inclined pipe portion 37 at a small angle $\theta 2$ such as 30° with respect to a horizontal direction allows the velocity component in the flow of the liquid state refrigerant in a vertical direction to be further reduced, resulting in the creation of a boundary between liquid phase and the gas phase, which allows the liquid state refrigerant to be kept in the inclined pipe portion 37 downstream from the bent pipe portion 36.

The liquid state refrigerant in the inclined pipe portion 37 is, after being passed through the dryer 41 and filter 42 to remove a moisture content and impurities such dust or dirt, gradually introduced into the inlet tank 26 of the second header 17, via the outlet pipe portion 38, due to the pressure generated by the compressor 2. The liquid state refrigerant thus introduced into the supercooling section 14 is distributed into the tubes 18 located below the line A, which constructs the core portion of the supercooler section 14. The liquid phase refrigerant distributed to the tubes 18 are subjected to a heat exchange with the air flow generated by the fan 12 which contacts with the outer walls of the tubes 18, so that the liquid state refrigerant at a desired degree of a supercooling flows into the outlet tank section 21 of the second header 16.

The liquid state refrigerant flowing into the first header 16 is taken out from the outlet fitting 23, flows into the metal pipe 43, and is, via the sight glass 5 and the metal pipe 47, directed to the expansion valve 6 (FIG. 1). An introduction of single phase, liquid refrigerant into the expansion valve 6 allows a sufficient amount of liquid state refrigerant in the valve 6 to be always maintained, which prevents any hunting by the valve member of the expansion valve 6. Namely, the desired amount of mist state refrigerant is always supplied to the evaporator 7, thereby preventing the refrigerating performance of the air conditioning apparatus from deteriorating.

According to the refrigerating system 1 of the first embodiment, even in the case where a large value of the vertical component in the speed of the refrigerant is obtained due to large values of the inclination $\theta 1$ and $\theta 2$ of the inclined pipe portions 35 and 37 with respect to the horizontal direction, the centrifugal force at the bent pipe portion 36 combined with a reduction in the velocity of the refrigerant by the provision of an inclination of the pipe portions 35 and 37 can produce an effective, vertical separation of the liquid phase and gas phase of the refrigerant, due to different values of specific weight. Furthermore, the provision of the bent pipe portion 36 in the receiver 4 combined with the separating operation using the above mentioned centrifugal force can reduce the value of the angle of the receiver 4 made from an elongated pipe when compared with the construction in the prior art, so that a sufficient reduction in the vertical component of the velocity of the liquid refrigerant is obtained at the location (the pipe portion 37) downstream from the bent pipe portion 36. Thus, the vertical component of the refrigerant velocity is sufficiently small enough to prevent an occurrence of bubbles at the boundary between the liquid and gaseous phase, which allows only the liquid refrigerant to be supplied to the supercooler section 14 of the condenser 3 via the outlet portion 38.

Furthermore, according to the receiver of this embodiment, a receiver 4 made of pipes of reduced diameter, compared to the prior art construction, can be arranged in front of the condenser 3 made as an integral structure of the condenser section 13 and the supercooler section 14, without requiring a large, additional space. It should be noted that the diameter and the length of the receiver 4 should be determined so that the volume of the refrigerant determined thereby has a sufficient margin irrespective of any variation in load in the refrigerating cycle as well as an amount of a possible leakage of the refrigerant from the system.

Furthermore, according to this embodiment, even the same value of width of the condenser 3, as that in the prior art, can produce a reduction in the value of the inclination angle θ1 and θ2 of the pipe portions 35 and 37 of the receiver 4 as well as an increase in the length of the receiver from the inlet pipe portion 34 to the outlet pipe portion 38 due to the provision of the bent portion 36 for changing a direction of the flow between that in the pipe portion 35 and that in the pipe portion 37.

Figure 5A:
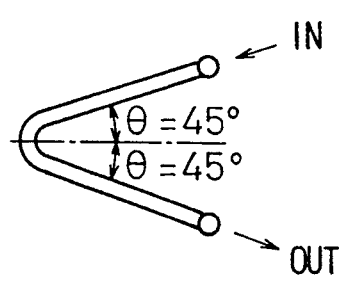
FIGS. 5A and 5B show the geometry of the receivers in the present invention and the prior art, respectively.
Figure 5B:
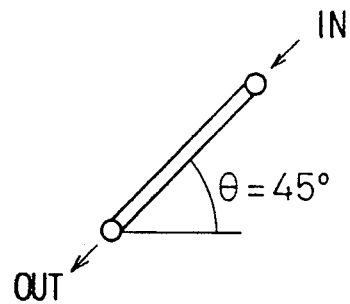

The inventors have done test as to the supercooler performance of the refrigerating system 1 according to the present invention having the bent portion 36 in a location in the receiver 4 in comparison with the prior art one with no such a bent portion. These tests were conducted when the outside temperature was 35° C., the rotational speed $N_c$ of the compressor 2 was 780 r.p.m., and the inner diameter of the receiver 4 was 17 mm. In FIG. 4, the abscissa indicates the amount of the refrigerant in the refrigerating circuit, while the ordinate indicates the degree (°C.) of supercooling as obtained. A solid line M is a relationship between the amount of the refrigerant and the supercool in the present invention, while a dotted line N is the same relationship in the prior art. Namely, in the receiver according to the present invention in this test, as shown in FIG. 5A, the value of the inclination angle θ1 of the first inclined pipe portion 35 is 45°, while the value of the inclination angle θ2 of the second inclined pipe portion 37 is 45°. In the prior art in FIG. 5B, no provision is made as to the bent portion. Namely, a single pipe is provided, which is inclined at an angle θ of which is equal to 45°.

As will be easily understood from the result of the tests in FIG. 4, in the prior art with no bent portion, the value of the inclination θ of the pipe of value of 45° provides a large vertical component in the flow velocity of the refrigerant, which prevents a boundary from being created between the gas phase and the liquid phase due to the formation of bubbles. As a result, from the outlet pipe 38, a gas phase refrigerant combined with a liquid phase refrigerant is issued, which causes the supercooling condition to be unstable with respect to the change in the amount of the refrigerant in the recirculating line 1, which deteriorate the phase separation performance at the reservoir.

Contrary to this, according to the present invention provided with the bent portion 36 in the receiver 4, even if the value of the inclination angle θ1 or θ2 is as large as 45°, i.e., vertical component of the flow velocity of the refrigerant is large, and a boundary between the gaseous phase and the liquid phase is easily created, inside the receiver 4, which is effective to prevent gas phase refrigerant from being issued out of the outlet pipe portion 38. As a result, a substantially constant value of supercooling is obtained with respect to the change in the amount in the refrigerant in the recirculation system 1, which improves the function of the receiver 4. In other words, according to the present invention, an increased range of the value of the inclination angle of the receiver, which can provide a desired performance, is obtained. Furthermore, a decrease in the diameter of the receiver over the prior art construction is obtained while maintaining the same inclination angle the receiver with respect to the condenser.

Figure 6:
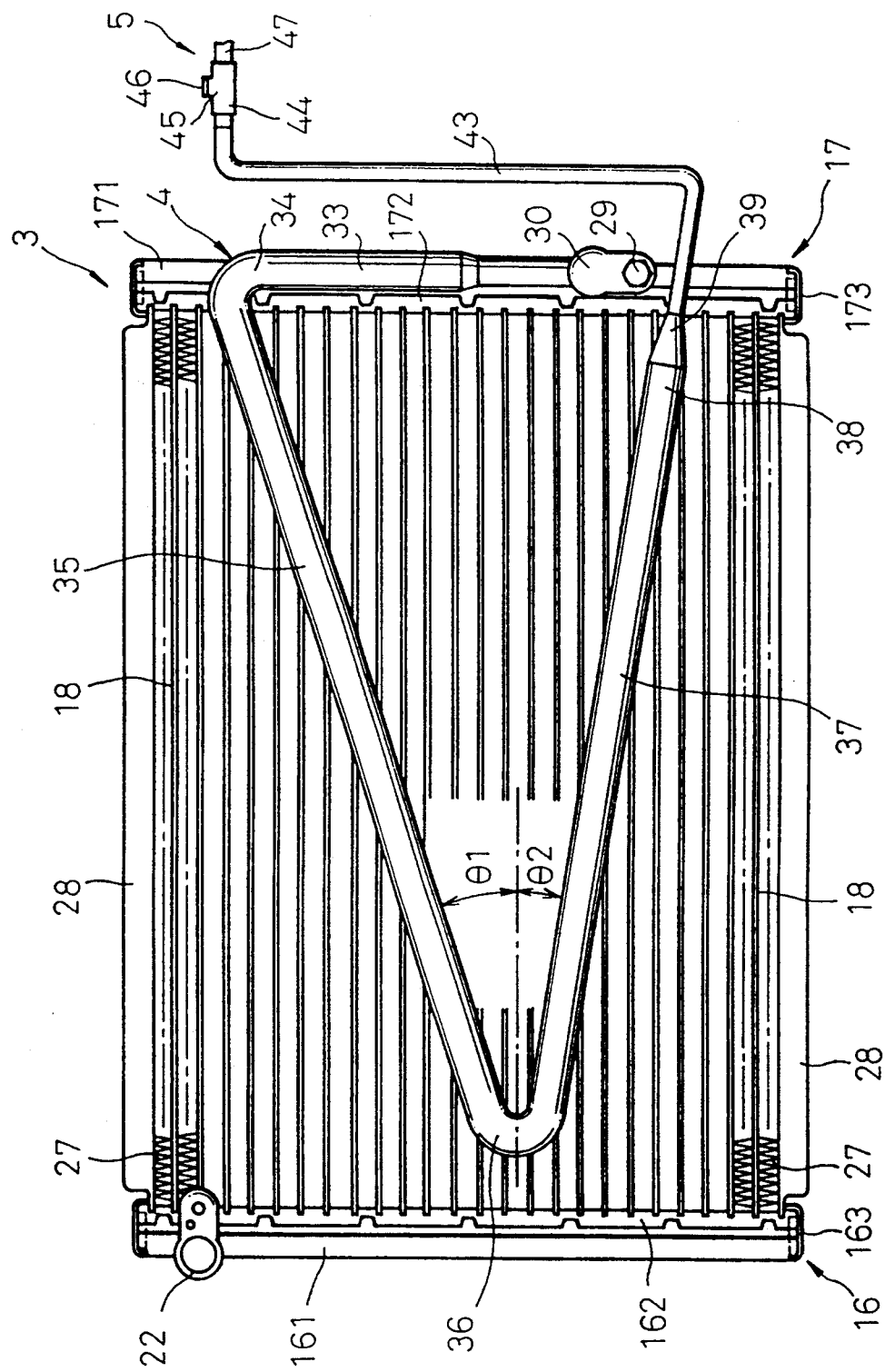
FIG. 6 is similar to FIG. 2, but illustrates a second embodiment.

FIG. 6 is similar to FIG. 2, but illustrates a connection of the condenser 3 to the refrigerant receiver 4 and a sight glass 5 in a second embodiment, where the condenser 3 has no supercooling function. Since no supercooler is provided, the first and second headers 15 and 17 do not have the partitions 19 and 24, respectively in FIG. 2 in the first embodiment. Namely, the first header 16 forms therein with a single tank 161 connected to all of the heat exchanging tubes 18, while the second header 17 forms therein with a single tank 171 connected to all of the heat exchanging tubes 18. The second header 17 is connected to the inlet end of the receiver 4 by means of the connector 30. The outlet end of the receiver 4 is connected to the pipe 43 which is connected to the sight glass 5. The refrigerant from the compressor 2 (FIG. 1) is received by the inlet tank 161 via the inlet fitting 22, and is distributed to the tubes 18. A heat exchange between the outside air and the refrigerant in the tubes 18 occurs for condensing the refrigerant. The condensed refrigerant from the tubes 18 is introduced into the outlet tank 171 and is discharged to the receiver 4 via the inlet connector 30. At the receiver 4, the liquid state refrigerant is separated and is directed, via the pipe 43, the sight glass 5, and the pipe 47, to the expansion valve 6 (FIG. 1).

In the embodiment in FIG. 6, at the receiver 4, due to the provision of the bent pipe portion 36, the centrifugal phase separation between the gas phase and liquid phase and the inclination of the pipe portions 35 and 38 allows the vertical component in the velocity of the liquid refrigerant to be reduced. As a result, the phase separation at the receiver is idealized, so that the liquid state refrigerant is effectively issued. As a result, the desired amount of the liquid refrigerant from the receiver 4 to the expansion valve 6 (FIG. 1) is obtained, thereby preventing any reduction in the performance of the refrigerating system for an air conditioning apparatus for a vehicle.

Figure 8:
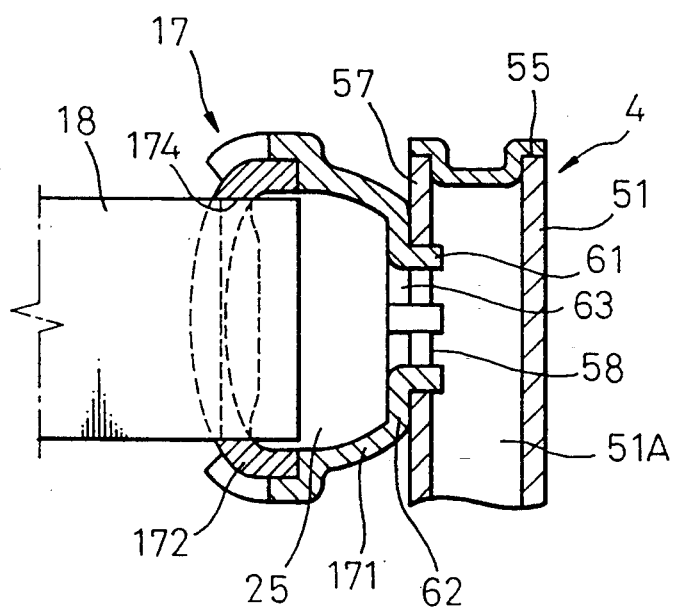
FIG. 8 is a cross sectional view taken along line XIII—XIII in FIG. 7.
Figure 9:
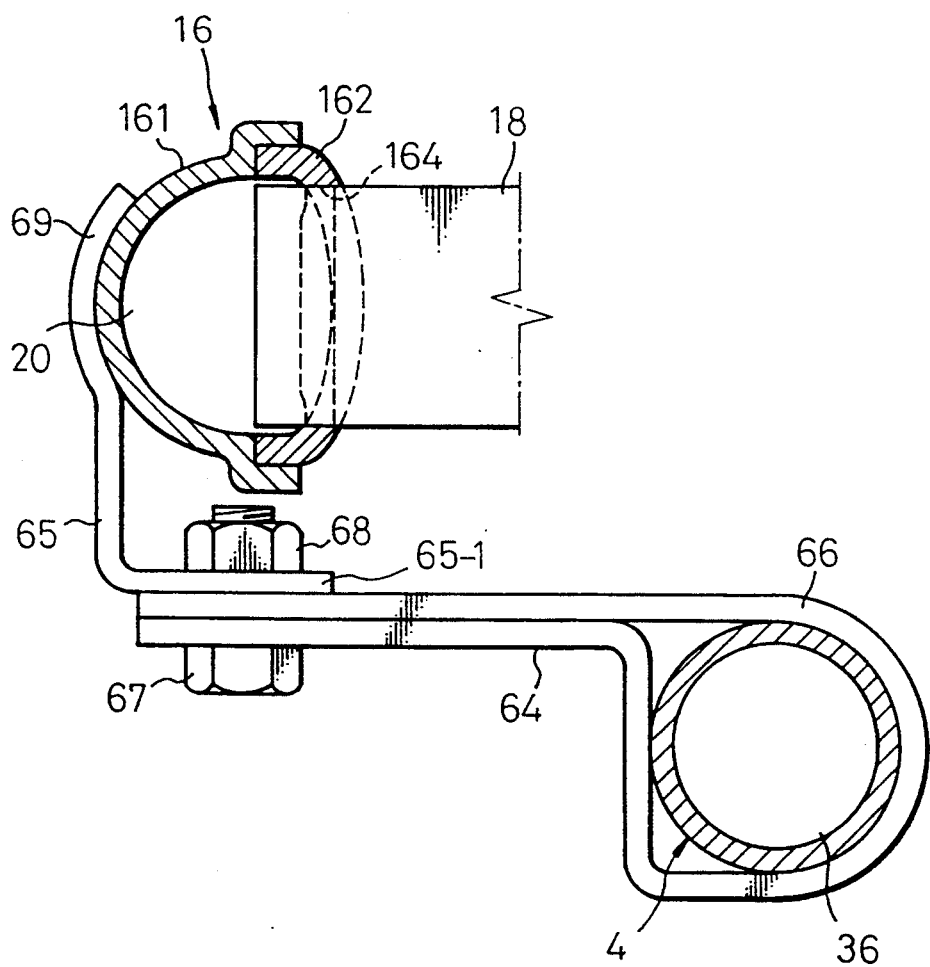
FIG. 9 is a cross sectional view taken along IX—IX in FIG. 7.
Figure 10:
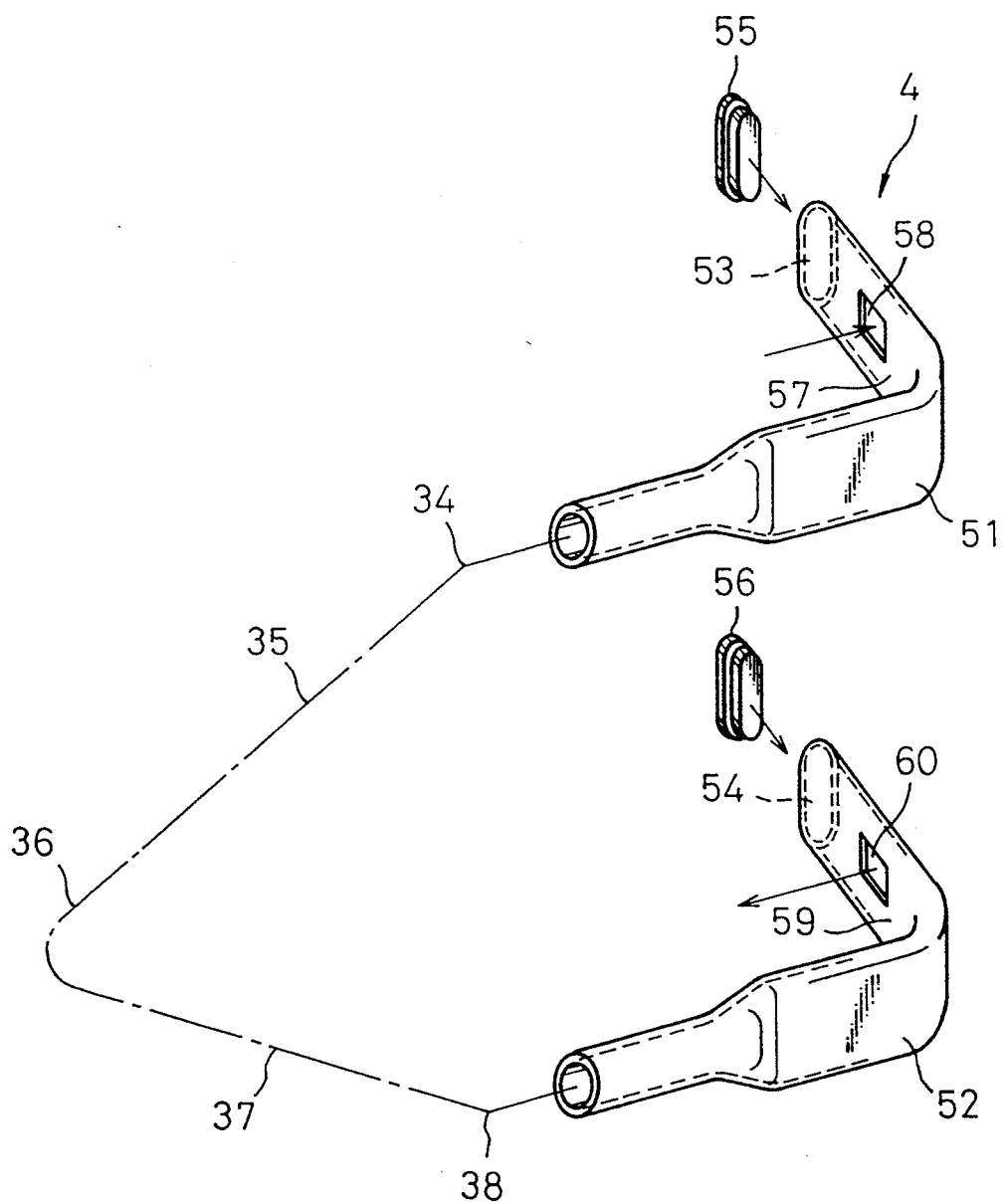
FIG. 10 is a perspective view of the receiver in the embodiment in FIG. 7.

FIGS. 7 to 10 illustrate a third embodiment. In this example, the receiver is formed as an elongated pipe of a diameter of, for example, 13 mm or 17 mm, made of metal material such as aluminum or an aluminum alloy, which is subjected to a bending process to obtain a substantially triangular shape which corresponding to the dimensions of the condenser 3. Furthermore, as shown in FIG. 10, the end portions of the pipe are subjected to a forging process to obtain a flattened shape of a substantially elongated circular cross-section.

Figure 7:
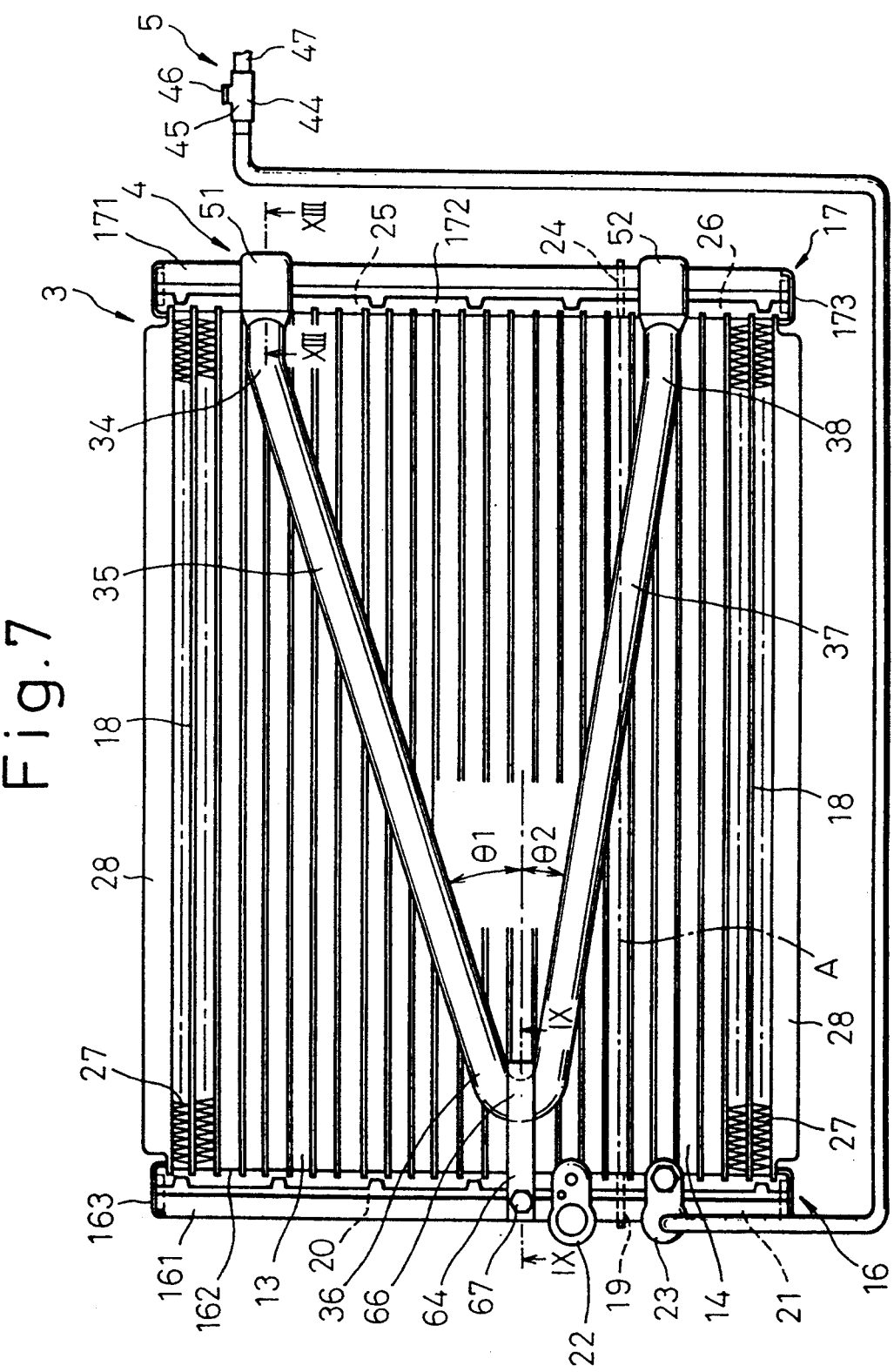
FIG. 7 is similar to FIG. 2, but illustrates a third embodiment.

As shown in FIG. 10, the receiver 4 is provided with an integral inlet side connecting pipe portion 51 of a cross sectional shape of a flattened elongated circular shape, which is, as shown in FIG. 7, located on one side of the refrigerant inlet pipe portion 34 adjacent the second header 17, and is also provided with an integral outlet side connecting pipe portion 52 of a cross sectional shape of a flattened elongated circular shape, which is located on one side of the refrigerant outlet pipe portion 38 adjacent the second header 17. These inlet side connecting pipe portion 51 and outlet side connecting pipe portion 52 have openings 53 and 54, respectively, to which closure caps 55 and 56, respectively, are fitted via a suitable permanent connecting means, such as soldering.

The inlet side connection pipe portion 51 is bent at a location along a length thereof so that a connection section 57 is created for connection of the portion 51 with the tank plate 171 (FIG. 8) of the second header 17. Namely, the connection section 57 of the pipe 51 is formed a communication opening 58 at its wall facing the header 17 which is opened to a space 51A inside the pipe portion 51. Similarly, the outlet side connection pipe portion 52 is bent at a location along a length thereof so that a connection section 59 is created for connection of the portion 52 with the tank plate 171 of the second header 17. Namely, the connection section 59 of the pipe portion 52 is formed with a communication opening 60 at its wall facing the header 17 which is opened to a space inside the pipe portion 52.

As shown in FIG. 8, the tank plate 171 is, at its side wall facing the inlet pipe portion 51 of the receiver 4, formed with a seat 62 which forms a plurality of connecting pieces 61 extending outwardly, which are engaged with the opening 58 at the connection pipe portion 51. The seat 61 is further formed with an opening 63 which communicates the space 25 inside the second tank 17 with the space 51A inside the connection section 51 of the receiver 4. As a result of this construction, a communication of the tank 25 with the receiver 4 is created for introduction of the condensed refrigerant from the condenser section 13 into the receiver 4. A connection of the outlet side connection portion 52 with the inlet side tank 26 to the supercooler 14 is done as similar way as explained with reference to FIG. 8. It should be noted that the header plate 172, which constructs, together with the tank plate 171, the second header 17, is formed with a plurality of insert openings 174, to which respective right hand ends of the heat exchanging tubes 18 are inserted.

As shown in FIGS. 7 and 9, according to this embodiment, the bent pipe portion 36 of the receiver 4 is supported by the tank plate 161 of the first header 16 by means of a bracket 64 and a stay 65. These bracket 64 and the stay 65 are made from a plate material by subjecting it to a forging process to obtain desire shapes. The bracket 64 forms a holder portion 66 for holding the bent portion 36 of the receiver 4. The stay 65 has a first end 65-1 connected to the bracket 64 by means of a bolt 67 and nut 68 and a second end 69 connected to the tank plate 161 by means of a soldering. It should be noted that the header plate 162, which constructs, together with the tank plate 161, the first header 16, is formed with a plurality of insert openings 164, to which respective left hand ends of the heat exchanging tubes 18 are inserted.

As similar to FIG. 3 in the first embodiment, inside the receiver 4 in FIG. 7, arranged in the receiver is a dryer 41 confined between a pair of spaced apart holder 40 and a filter 42 of mesh type for removing impurities such as dust or dirt included in the refrigerant. These holders 40 can be made from a punched metal plate, which are fitted to the receiver before it is bent to the triangular shape. The filter 42 is formed from tubular metal having an outer diameter which is slightly smaller than the inner diameter of the receiver 4.

A process for assembling the condenser 3 and receiver 4 will now be explained with reference to FIGS. 6 to 10. According to this embodiment, the first and the second headers 16 and 17, the tubes 18, and the caps 55 and 56 are made from a brazing sheet, made of aluminum plate having outer surfaces on which a soldering material is cladded, are used for producing the first header 16. Contrary to this, the receiver 4, the brackets 64 and the stay 65 are made from an usual aluminum plate with no cladding of soldering material.

First, onto one of the side plates 28, the corrugated fins 27 and the tubes 18 are alternately laminated, and finally, onto the last laminated corrugated fin 27, the other side plate 28 is mounted, so that the core portions for the condenser section 13 and the supercooler section 14 are formed. Next, the left-handed and right-handed ends of the tubes 38 are inserted to corresponding openings 164 and 174 of the header plates 162 and 172, so that the tubes 18, the corrugated fins 27 and the header plates 162 and 172 are connected with each other. At this state, a wire (not shown) is wound on the core portions of the condenser section 13 as well as the supercooler section 14 for maintaining the desired shape of the core portions.

Regarding the receiver 4, first, caps 55 and 56 are fitted to the ends of the inlet side and outlet side connection pipe portions 51 and 52, respectively. Then, the bracket 64 is assembled to the bent portion 36 of the receiver 4, and then, the stay 65 is connected to the bracket 64 by means of the bolt 67 and the nut 68. Then, the inlet side and the outlet side connection portions 51 and 52 are connected to the second header 17 by inserting the projecting pieces 61 of the tank plate 171 into the opening 58 and 60 of the portions 51 and 52, respectively, and by crimping the projecting pieces 61 at the recess 62. Then, tank plates 161 and 171 are connected to the header plates 162 and 172, respectively to obtain a provisionally assembled state. Then, the caps 163 and 173 are fitted to the open ends of the first and second headers 16 and 17, which are constructed by the tank plate 161 and the header plate 162, and the tank plate 171 and the header plate 172, respectively.

Then, the stay 65 is, at its connecting piece 69, contacted with the outer surface of the tank plate 171 to obtain a provisionally connected state, and then the bent portion 36 of the receiver is assembled to the tank plate 161 by means of the bracket 64 and the stay 65. Finally, a vacuum soldering process is executed, which causes the soldering porions of the condenser 3 and the receiver 4 to be finally connected, which allows the receiver 4 to be assembled in front of the front surface (air inlet surface) of the condenser by means of the bracket 64 and the stay 65.

In the above third embodiment, due to an employment of integral connection portions 51 and 52 (FIG. 10) a reduction in the number of the parts for obtaining a connection of the receiver 4 to the condenser 3 over the construction of the first and second embodiments. Thus, a increase in the labor efficiency as well as a reduction in the production cost are obtained.

Figure 11:
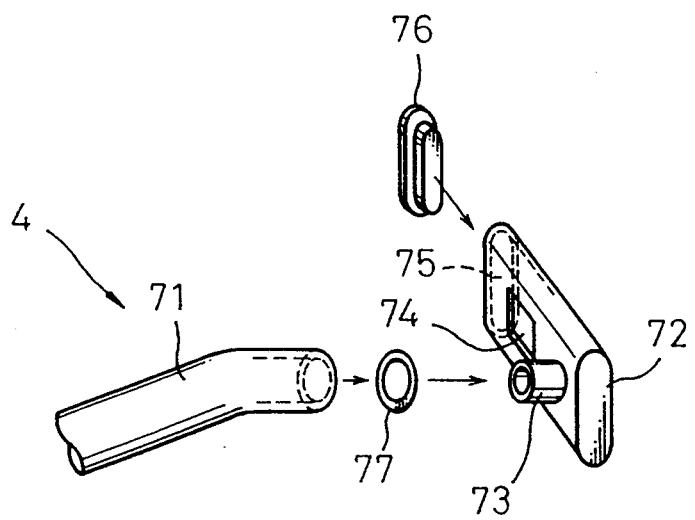
FIG. 11 is a perspective view of a connection pipe in a fourth embodiment.

FIGS. 11 shows an inlet side connecting pipe portion 72 of the receiver in a fourth embodiment. Namely, the inlet connection pipe 72 is separate piece from a pipe 71 for constructing the receiver 4. The inlet connection pipe 72 has a cross sectional shape of an elongated circle. Such a separate construction of the connection pipe portion makes it possible to reduce the number of process for producing the device. The inlet side connection pipe portion 72 is connected to the second header 17 of the condenser 3 by a soldering in the similar way as that in the third embodiment as explained with reference to FIG. 8. The inlet side connection portion 72 is made by machining from a block of aluminum so that a fitting portion 73 of tubular shape for connection to the pipe 71 and a communication port 74 of a rectangular cross sectional shape for connection with the outlet tank portion 25 in the second header 17 of the condenser section 13 as similar shown in FIG. 8 for the third embodiment. A cap 76 is connected to the open end 75 of the inlet side connection pipe portion 72 by means of soldering so that the open end 75 is closed by the cap 76. Finally, in FIG. 11, a brazing ring 77 made of soldering material, which is arranged between an inner surface of the pipe 71 with no cladding layer of a soldering material and an outer surface of the communication pipe portion 73. The provision of the brazing ring 77 allows that the pipe portion 71 of the receiver 4 and the communication pipe portion 73 of the connection pipe 72 to be connected with each other by means of a single vacuum soldering operation.

In the embodiments as illustrated, only one bent portion 36 is provided in the receiver 4. However, a plurality of such bent portions can be provided in the receiver in accordance with the positions of the condenser, the receiver and the pressure reducer.

In the embodiment, the angle of the inclination of the pipe portions 35 and 37 may be the same along the entire length thereof. However, such an arrangement may be possible that nearer the inlet portion to of the receiver larger the value of the inclination angle, while nearer the outlet portion from the receiver smaller the value of the inclination angle. Such a construction is effective for preventing a gas phase refrigerant from being issued from the outlet end of the receiver.

The shown embodiments are directed to an application to a condenser of corrugated fin tube type. However, the present invention can be also applied to plate fin tube type condenser.

Finally, other than the air conditioning device for a vehicle, the present invention can be applied to other appliances such as air conditioning apparatus for houses or factories.

Many modifications and changes can be made by those skilled in this art without departing from the scope and spirit of the invention.

We claim:

1. A refrigerating apparatus comprising:
    a compressor for compressing a refrigerant;
    a condenser for condensing the refrigerant from the condenser;
    a receiver for receiving the refrigerant from the condenser;
    a pressure reducer for reduction of the pressure of the refrigerant from the receiver;
    an evaporator for evaporating the refrigerant from the pressure reducer;
    a recirculating line for connection of the compressor, the condenser, the receiver, the pressure reducer and the evaporator for obtaining a refrigerating circuit;
    said condenser defining spaced apart surfaces and being in contact with an air flow so that a heat exchange can take place between the air flow transverse to said surfaces and the refrigerant flowing in said condenser;
    said receiver being arranged adjacent to the surface of the condenser to which the air flow is introduced, the receiver being constructed as an elongated pipe having a refrigerant inlet and a refrigerant outlet, which is located at a position lower than that of the inlet end, and an intermediate pipe having portions included with respect to a horizontal direction and at least one bent portion between the inclined portions for obtaining a rapid change in the direction of the flow of the refrigerant in the receiver, and
    a supercooler for obtaining a heat exchange of the refrigerant with the air flow, said receiver being arranged between the condenser and the supercooler.

2. A refrigerating apparatus according to claim 1, wherein said condenser and the supercooler are formed integrally.

3. A refrigerating apparatus according to claim 2, wherein said condenser comprises a spaced apart first and second header and a plurality of parallel tubes, each of which has a first end connected to the first header and a second end connected to the second header, the first and second header having therein partitions, respectively, for dividing the space in the first header into first and second sections and the space in the second header into first and second sections, the tubes connecting the first sections of the first and second headers constructing the condenser, the tubes connecting the second sections of the first and second headers constructing the supercooler, the inlet end of the receiver being connected to the first section of the second header, the outlet end of the receiver being connected to the second section of the second header.

4. A refrigerating apparatus according to claim 3, further comprising connection pipe portions which are integrally extended from the inlet and outlet ends, respectively of the receiver, said connection pipe portions being connected to the second header by means of soldering.

5. A refrigerating apparatus according to claim 4, wherein the portion of the receiver from the bent portion to the refrigerant outlet end is inclined to the horizontal line at an angle in a range which is larger than 10° and smaller that 45°.

6. A refrigerating apparatus according to claim 5, further comprising a sight glass disposed in the recirculation line between the supercooler and said pressure reducer for monitoring the condition of the refrigerant from said condenser.

7. A refrigerating apparatus according to claim 1, wherein the angle of inclination of the inclined portion upstream from the bent portion is larger than the angle of inclination of the inclined portion downstream from the bent portion.

* * * * *